June 7, 1949.                T. SCHUELER                2,472,442
                              BRAKE LOCK
                          Filed April 25, 1947
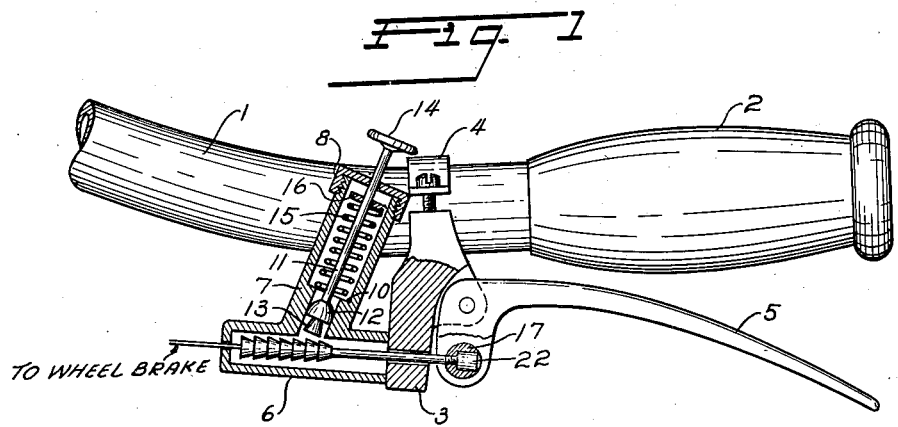
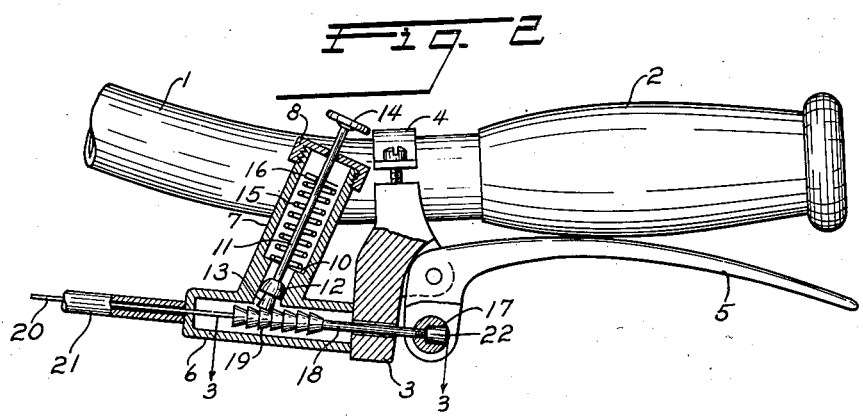
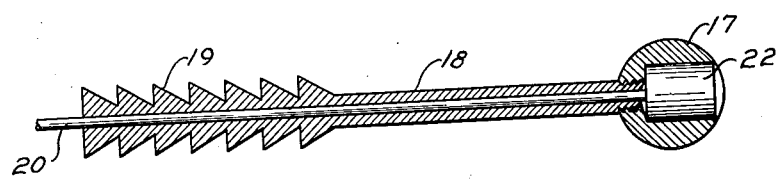
INVENTOR.
THEODORE SCHUELER
BY
Scrivener & Parker
ATTORNEYS Patented June 7, 1949

UNITED STATES PATENT OFFICE 2,472,442

BRAKE LOCK

Theodore Schueler, Wood River, Ill.

Application April 25, 1947, Serial No. 743,759

7 Claims. (Cl. 74—489)

1

The present invention relates to brakes and, more particularly, to means for locking a hand operated brake after it has been applied.

The principal object of the invention is to provide a locking device in association with a hand operated actuator for a brake, the operation of both braking and locking being carried out by the same hand.

A further object of the invention is to provide means for positively locking a hand operated brake in any one of a number of different operative positions.

The invention is adapted to be used on two wheeled vehicles on which a brake operating hand lever is provided. The advantages of providing such a positive locking means will be apparent to operators of motorcycles and the like as the operation of such vehicles requires a large number of manipulations of the hands, usually within a short period of time.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a side view, partially in section, showing my brake locking means in unlocked position;

Fig. 2 is a side view, partially in section, showing my brake locking means in locked position, and Fig. 3 is an enlarged sectional view taken on lines 3—3 of Fig. 2.

Referring to the drawings there is disclosed a portion of a handle bar 1 having mounted on the rear end thereof the hand grip 2. Attached to the handle bar in front of the hand grip is a depending bifurcated bracket 3 held by a clamping plate 4. A hand brake lever 5 is pivotally connected to the rear portion of the bracket 3. Mounted on the front face of the bracket 3 is a horizontally extending cylindrical housing 6 having integrally formed therewith a substantially vertically extending hollow housing 7 having a screw-cap 8 secured to the top thereof, a small hole being provided in the center of the cap. The vertical housing is rearwardly inclined, the purpose of which will be described hereinafter. The lower inside portion of the housing 7 is of reduced diameter, thereby providing shoulders 10. A plunger 11 is adapted to be mounted in slidable relation in the housing 7, a portion of the plunger being provided with an enlarged shoulder 12 that abuts the reduced portion of the housing. An elongated detent 13 is integrally formed on the extreme lower portion of the plunger, the detent being in the shape of a truncated cone. The upper end of the plunger, which extends through the hole in the cap 9, is provided with a thumb piece 14. A spring 15 surrounds the plunger 11, the lower end of the spring resting on the shoulders 10 while the upper end of the spring abuts a plate 16 fixed to the plunger. In normal position the plunger 11 is extended outwardly by the spring and the detent 13 is contained within the reduced portion of the housing 7.

The lower portion of the hand brake lever is provided with a socket in which is fitted a substantially hollow ball 17. Attached to the ball 17 and extending forwardly through a suitable opening in the bracket 3 and into the housing 6 is a hollow rod 18, the end portion of the rod being provided with a series of teeth or ratchets 19. Extending from the front wheel brake, which is not shown, is an actuating cable 20 enclosed in a suitable housing 21, the cable extending through rod 18 and being anchored in the hollow portion of the ball 17 by any suitable means, in the present instance, the cable being anchored in a solder plug 22. The cable 20 is normally under tension due to the action of the brake spring, thereby holding the brake operating lever 5 away from the hand grip 2.

In operation, when the brake lever is actuated, the handle pulls cable 20 and rod 18 on which the ratchets are mounted to the rear to apply the brakes. The plunger 11 is then depressed by thumb piece 14 against spring 15 and the detent 13 engages one of the surfaces of the ratchets 19 mounted on the cables. With the detent in this position the hand lever is released and the co-action between the detent and the ratchet prevents releasing of the brake cable. When it is desired to release the brake it is only necessary to pull the lever in order to permit the detent to clear the face of the ratchet that it has engaged. The spring then forces the rod to its normal extended position and the detent and ratchets are thereby automatically disengaged. The handle is then released and with it the brake.

The housing 7 is mounted at an angle to the housing 6 to provide easier access by the operator to the thumb piece 14. Because of this construction it is, therefore, necessary to construct the detent as shown in the drawings to provide a more positive engagement between the detent and the flat faces of the ratchets. It will also be seen that by providing a series of teeth or ratchets on the rod 18, the brakes may be set in any of a number of different positions.

I claim:

1. A lock for a hand operated brake lever comprising a bracket attached to the vehicle steering bar, a hand operated brake actuating lever pivotally connected to the bracket, a horizontally extending cylindrical housing mounted on the front of said bracket and having integrally formed therewith a substantially vertically extending cylindrical housing, the lower inner diameter of said vertical housing being reduced, a plunger mounted in said vertical housing having a shoulder slidable within the reduced portion of said housing, a spring surrounding said plunger and adapted to maintain said plunger in extended position, a detent integral with the lower end of the plunger and normally positioned within the reduced portion of said vertical housing, a hollow rod attached to the said lever and extending into said horizontal housing, the forward end thereof being provided with a series of ratchets which are adapted to be engaged by the said detent when the plunger is depressed, and a brake operating cable extending through the rod and being operable by the operating lever.

2. A lock for a hand operated brake lever according to claim 1, in which the rear portion of the hollow rod is provided with a hollow ball adapted to seat in a cylindrical socket in said operating lever, and means attached to the brake operating cable and disposed within the ball to lock the ball and cable together, to permit simultaneous movement of the rod and cable when the brake lever is actuated.

3. A lock associated with a hand operated actuator for a brake comprising a cylindrical housing having disposed therein a rod having a series of ratchets on one end thereof, the other end being attached to said actuator, a brake operating cable extending through said rod and also being attached to said actuator, a second housing secured to the first housing and extending substantially vertically thereof, a plunger mounted for reciprocal movement in said second housing, said plunger being provided on the lower end thereof with a detent normally out of the path of movement of said ratchets but adapted to engage one of the ratchets when the plunger is depressed to lock the brake, and means for returning said plunger and detent to its normal position when slight pressure is applied to the actuator after the brake has been set.

4. A lock for a hand operated brake lever comprising a bracket attached to the vehicle steering bar, a hand grip on the end of said bar to the rear of said bracket, a hand operated brake actuating lever pivotally connected to the bracket, a cable connecting the lever to the brake to be actuated, a series of ratchets operatively connected to said lever and surrounding said cable throughout a portion of its length, said ratchets being contained in a horizontally disposed housing mounted on the front face of said bracket, means operated by hand to lock the brake lever in one of a number of positions, said means comprising a detent attached to a spring pressed plunger slidably mounted in a vertically extending, rearwardly inclined housing secured to said first housing, said locking means being operated when the vehicle operator squeezes the lever against the hand grip to apply the brake while pressing the plunger having the detent attached thereto into engagement with one of the ratchets, the connection between the detent and ratchet being automatically broken upon application of additional pressure to the brake lever.

5. A lock for a hand operated brake lever of the type wherein the lever is pivotally mounted upon a bracket secured to a vehicle steering bar and the brake is applied by squeezing the lever toward the steering bar, comprising a housing carried by the lower portion of the bracket, a brake actuating cable extending through the housing and having an end connected to the lever, a ratchet sheeve surrounding said cable and having a series of ratchets positioned in said housing, a second housing secured to the first housing and projecting upwardly and inclined rearwardly with respect to the first housing, a plunger slidably mounted in the second housing and having a detent formed at the lower end thereof for engaging one of said ratchets, a spring within the second housing and normally urging the plunger and detent to a released position, said plunger being provided with a button at its upper end, the button and plunger being so constructed and arranged as to be pressed downwardly by the thumb of the operator to engage the detent with one of the ratchets to lock the brake when the brake lever is squeezed toward the steering bar by the hand of the operator.

6. A lock for a hand operated brake lever of the type wherein the lever is pivotally mounted upon a bracket secured to a vehicle steering bar and the brake is applied by squeezing the lever toward the steering bar, comprising a housing carried by the lower portion of the bracket, a brake actuating cable extending through the housing and having an end connected to the lever, a ratchet sleeve surrounding said cable and having a series of ratchets positioned in said housing, a second housing secured to the first housing and projecting upwardly and inclined rearwardly with respect to the first housing, a plunger slidably mounted in the second housing and having a detent formed at the lower end thereof for engaging one of said ratchets, a spring within the second housing and normally urging the plunger and detent to a released position, said plunger being provided with a button at its upper end, the button and plunger being so constructed and arranged as to be pressed downwardly by the thumb of the operator to engage the detent with one of the ratchets to lock the brake when the brake lever is squeezed toward the steering bar by the hand of the operator, said plunger and detent automatically being returned to normal position when it is desired to unlock the brake by slight additional pressure being applied to the lever to permit disengagement of the detent and ratchet.

7. A lock for a hand operated brake lever according to claim 5, in which the detent is in the form of a truncated cone to permit more positive engagement between the detent and the ratchet.

THEODORE SCHUELER.

REFERENCES CITED

The following references are of record in the file of this patent:

FOREIGN PATENTS

| Number | Country | Date |
|---|---|---|
| 43,046 | France | Jan. 25, 1934 |
| 330,353 | Great Britain | June 12, 1930 |